United States Patent
Tokoro

(10) Patent No.: US 7,613,884 B2
(45) Date of Patent: Nov. 3, 2009

(54) MULTIPROCESSOR SYSTEM AND METHOD ENSURING COHERENCY BETWEEN A MAIN MEMORY AND A CACHE MEMORY

(75) Inventor: Masahiro Tokoro, Philadelphia, PA (US)

(73) Assignee: Hitachi, Ltd., Tokyo (JP)

( * ) Notice: Subject to any disclaimer, the term of this patent is extended or adjusted under 35 U.S.C. 154(b) by 159 days.

(21) Appl. No.: 11/044,454

(22) Filed: Jan. 28, 2005

(65) Prior Publication Data

US 2005/0198441 A1 Sep. 8, 2005

(30) Foreign Application Priority Data

Feb. 19, 2004 (JP) ............... 2004-042541

(51) Int. Cl.
*G06F 13/00* (2006.01)
(52) U.S. Cl. ............ 711/144; 711/118; 711/119; 711/128; 711/141; 711/145; 711/146; 711/147; 711/153
(58) Field of Classification Search ........ 711/119, 711/141, 118, 128, 144–147, 153
See application file for complete search history.

(56) References Cited

U.S. PATENT DOCUMENTS

| | | | |
|---|---|---|---|
| 4,471,429 A * | 9/1984 | Porter et al. ............... | 711/144 |
| 6,587,931 B1 * | 7/2003 | Bauman et al. ............. | 711/145 |
| 2002/0087778 A1 * | 7/2002 | Schoinas ....................... | 711/1 |
| 2002/0124143 A1 * | 9/2002 | Barroso et al. ............. | 711/145 |
| 2003/0191905 A1 * | 10/2003 | Chen et al. .................. | 711/147 |
| 2004/0059876 A1 * | 3/2004 | Nanda et al. ................ | 711/141 |

FOREIGN PATENT DOCUMENTS

JP 10240707 9/1998

OTHER PUBLICATIONS

"Stanford Flash Multiprocessor", Proceedings of the 21st Annual International Symposium onComputer Architecture (Special Issue ISCA' 21 Proceedings, Apr. 18-21, 1994, p. 302-313.

* cited by examiner

*Primary Examiner*—Tuan V Thai
*Assistant Examiner*—Zhuo H Li
(74) *Attorney, Agent, or Firm*—Mattingly & Malur, P.C.

(57) ABSTRACT

A directory of each node in a shared memory multiprocessor is made up of directory entries each including one or more directory bits indicating whether the cache memory of another node stores a copy of a part of a memory region group of the main memory of one node. The memory region group includes memory regions having the same memory address portion including a cache index portion. Each node is assigned one of the directory bits. When accessing the main memory, the node checks whether the directory bits of the directory entry corresponding to a memory region to be accessed are set to a predetermined value, and if one or more of the directory bits of the directory entry are set to the predetermined value, an access address is multicast or broadcast to other nodes to perform coherency control.

19 Claims, 4 Drawing Sheets

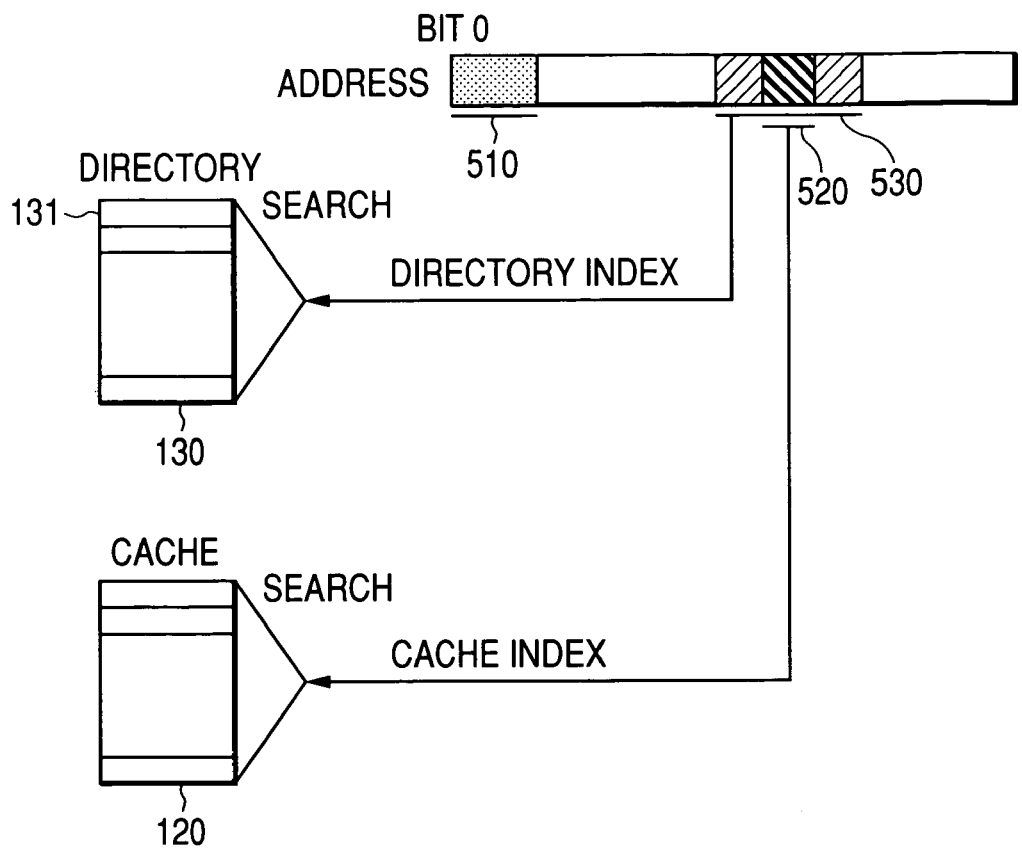

FIG. 5

| | DIRECTORY 130 | | | |
|---|---|---|---|---|
| NODE GROUP 0 | NODE GROUP 1 | NODE GROUP 2 | NODE GROUP 3 | |
| 0 | 0 | 0 | 0 | DIRECTORY INDEX = 0 |
| 0 | 1 | 0 | 0 | DIRECTORY INDEX = 1 |
| 0 | 0 | 1 | 1 | DIRECTORY INDEX = 2 |
| ⋮ | ⋮ | ⋮ | ⋮ | |
| 0 | 0 | 0 | 0 | DIRECTORY INDEX = $2^n-2$ |
| 0 | 0 | 0 | 0 | DIRECTORY INDEX = $2^n-1$ |

| DIRECTORY 130 | |
|---|---|
| 0 | DIRECTORY INDEX = 0 |
| 1 | DIRECTORY INDEX = 1 |
| 0 | DIRECTORY INDEX = 2 |
| | |
| 0 | DIRECTORY INDEX = $2^n-2$ |
| 0 | DIRECTORY INDEX = $2^n-1$ |

132

MULTIPROCESSOR SYSTEM AND METHOD ENSURING COHERENCY BETWEEN A MAIN MEMORY AND A CACHE MEMORY

CLAIM OF PRIORITY

The present application claims priority from Japanese application serial No. 2004-42541, filed on Feb. 19, 2004, the content of which is hereby incorporated by reference into this application.

BACKGROUND OF THE INVENTION

The present invention relates to a multiprocessor system, and more particularly to a control method for assuring the coherency of the main memory in a shared memory parallel computer system.

In recent years, computer systems, especially high end models, generally have a shared memory multiprocessor (SMP) configuration. Further, the number of the processors in a computer system sharing the same main memory has tended to be increased to enhance the performance of the entire system.

When a computer system has cache memory (hereinafter referred to simply as a cache), the computer must be controlled so as to assure consistency between data read from the cache and that read from the main memory. Especially in a shared memory parallel computer, if one processor has rewritten data stored in the main memory, the change in the data must be reflected in the copies stored in the caches of all the other processors. Such control is referred to as "main memory/cache coherency control".

Conventional computer systems use the MESI protocol, etc. to perform coherency control. The MESI protocol manages cache lines in a cache by assuming that they can be in one of four states, namely "M" (Modified), "E" (Exclusive), "S" (Shared), and "I" (Invalid) states. (A cache line is a continuous memory region in a cache, and data in a cache is handled on a cache line basis.) In a computer using the MESI protocol, each processor generally determines whether to issue a cache coherency control request for a particular cache line based on its MESI state.

However, in the case of a computer system using a conventional cache coherency control technique such as the MESI protocol, each processor only knows the states of the lines in its own cache. This means that, for example, when a line (of data) that has missed the cache is fetched from the main memory, a coherency control request must be broadcast to all the other processors in the system.

Further, even when a line (of data) that has hit the cache is processed, the processor must broadcast a coherency control request, such as a cache invalidation request, to all the other processors in the system since the processor does not have any information indicating which one or ones of them have a copy of the data (line) in their cache.

Therefore, in computer systems which use only a conventional protocol such as the MESI protocol to perform cache coherency control, the number of transactions for the cache coherency control increases with increasing number of processors which share the same main memory. This means that a computer system having a large scale SMP configuration has a problem in that its performance is degraded due to the bottleneck created by such coherency control.

To address the above problem, the following document proposes a method for reducing the number of coherency control transactions using a directory system: "The Stanford FLASH Multiprocessor", PROCEEDINGS OF THE 21$^{ST}$ ANNUAL INTERNATIONAL SYMPOSIUM ON COMPUTER ARCHITECTURE (SPECIAL ISSUE ISCA' 21 PROCEEDINGS, Apr. 18-21, 1994), p. 302-313. In this method, each line in the main memory includes directory information indicating which processor(s) has a copy of the line in its cache. Each processor checks this directory information before broadcasting any coherency control transaction, and sends out a coherency control transaction to only lines and processors that actually require coherency control, thereby considerably reducing the number of transactions.

However, this method requires that each line include a directory entry for indicating whether its copy (or copies) exists in the system (indicating which processor(s) has a copy of the line). Implementing such a function requires a large amount of hardware, resulting in increased cost. Assume, for example, that the line size is 128 B (bytes) and the main memory size is 4 GB. In such a case, even if the directory size per entry is 1 bit, 32 MB (=4 GB/128 B*1 bit) of memory is additionally needed, which is a large overhead.

Generally, the directory is often implemented in main memory (DRAM) since it requires a large amount of memory. Therefore, the processor must first read the directory in the main memory each time it accesses the main memory. This leads to considerably increased access latency to the main memory since the latency for reading the directory itself is long. To solve this problem, directory information may be copied to the cache. However, such an arrangement further increases the amount of hardware, resulting in increased implementation cost.

To overcome these problems, Japanese Patent Laid-Open No. 10-240707 proposes a method of assigning each directory entry to a page, which is a larger continuous memory region than a line.

However, assigning each directory entry to a continuous memory region larger than a line makes it difficult for hardware to detect whether the cache stores a copy of the memory region indicated by a given directory entry. Therefore, this system requires support from software such as the OS to reset directory information.

Furthermore, generally, the execution time is longer when the reset function is implemented by software than when it is implemented by hardware, causing the problem of degraded performance. Implementing the reset function by hardware also presents its own problem: a cache tag must be read out a plurality of times to determine the presence or absence of a copy, which makes it difficult to reset directory information at high speed.

SUMMARY OF THE INVENTION

An object of the present invention is to provide coherency control for a shared memory multiprocessor which requires a reduced amount of hardware and which makes it easy for hardware to reset directory information.

To accomplish the above object, the present invention provides a shared memory multiprocessor which includes a plurality of nodes connected to one another and in which cache coherency control is carried out between the nodes. Each node comprises: a main memory for storing data; a cache memory for storing a copy of data obtained from the main memory; and a CPU for accessing the main memory and the cache memory and processing data. Further the node comprises a directory and a memory control unit. The directory is made up of directory entries each including one or more directory bits which each indicate whether the cache memory of another node stores a copy of a part of a memory region group of the main memory of this node. The memory region group includes of memory regions having the same memory address portion including a cache index portion. The memory control unit performs steps of: when the node accesses the main memory, checking the directory bits of the directory entry corresponding to a memory region to be accessed; if one or more of the directory bits of the directory entry are set to a predetermined value, multicasting or broadcasting an access address to other nodes to perform coherency control; and if none of the directory bits of the directory entry is set to the predetermined value, performing no coherency control. When coherency control of the cache memory is performed, each memory control unit which received the broadcasted/multicasted the coherency control signal checks states of the cache memories in the node. If the cache memories store no copy of a memory region group, the memory control unit of the original node resets the directory bits of the directory entry corresponding to the memory region group to a default value.

According to another aspect of the present invention, the directory entries each include one directory bit.

According to still another aspect of the present invention, the multiprocessor includes N nodes, and the directory entries each include N directory bits, where N is an integer larger than 1.

According to yet another aspect of the present invention, the multiprocessor is configured such that: when the multiprocessor is, initialized, each directory bit is reset to the default value; and when a copy of a memory region of the main memory is created in a cache memory, the corresponding directory bit is set to the predetermined value.

Still a further aspect of the present invention provides a shared memory multiprocessor which includes N nodes connected to one another (where N is an integer larger than 1), the N nodes forming M node groups including of N/M nodes (where M is an integer larger than 1). A memory control unit performs steps of: when a copy of a memory region of the main memory is created in the cache memory of a node (this node or another node), setting one of the M directory bits of the directory entry corresponding to the memory region to a predetermined value, the one of the M directory bits corresponding to the node group including the node; when the node accesses the main memory, checking the directory bits of the directory entry corresponding to a memory region to be accessed; if one or more of the directory bits of the directory entry are set to the predetermined value, broadcasting an access address to other node groups, or multicasting the access address to the node groups indicated by the one or more of the directory bits, to perform coherency control; and if none of the directory bits of the directory entry is set to the predetermined value, performing no coherency control. When the coherency control is performed, the memory control unit checks the cache memories of nodes in related node groups. If the cache memories of the nodes in a node group store no copy of a memory region group to be subjected to the coherency control, the memory control unit resets a directory bit in the directory entry corresponding to the memory region group to a default value. The directory bit corresponds to the node group.

Yet another aspect of the present invention provides a coherency control method performing the above operations.

As described above, the present invention provides a shared memory multiprocessor in which each directory entry is assigned to a memory region group consisting of memory regions which have the same address portion including the cache index portion, instead of assigning it to a line. This can reduce the amount of hardware required for implementing the directory, as well as reducing the number of transactions for coherency control.

Since only a small amount of hardware is needed for coherency control, the directory can be implemented on the processor chip or a peripheral chip, which makes it possible to reduce the directory read latency and hence the main memory access latency.

Further, since each directory entry is assigned to a memory region group consisting of memory regions having the same address portion including the cache index portion, the directory data can be easily reset by hardware, eliminating the need for support by software.

BRIEF DESCRIPTION OF THE DRAWINGS

FIG. 3 is a diagram showing the portions of the memory address assigned to the cache and the directory according to the embodiment.

FIG. 4 is a diagram showing an exemplary configuration of the directory according to the embodiment.

FIG. 5 is a diagram showing an exemplary configuration of a directory according to another embodiment of the present invention.

FIG. 6 is a diagram showing an exemplary configuration of a directory according to still another embodiment of the present invention.

DETAILED DESCRIPTION OF THE PREFERRED EMBODIMENTS

A detailed description will be given below of coherency control for a shared memory multiprocessor according to preferred embodiments of the present invention with reference to the accompanying drawings.

Figure 1:
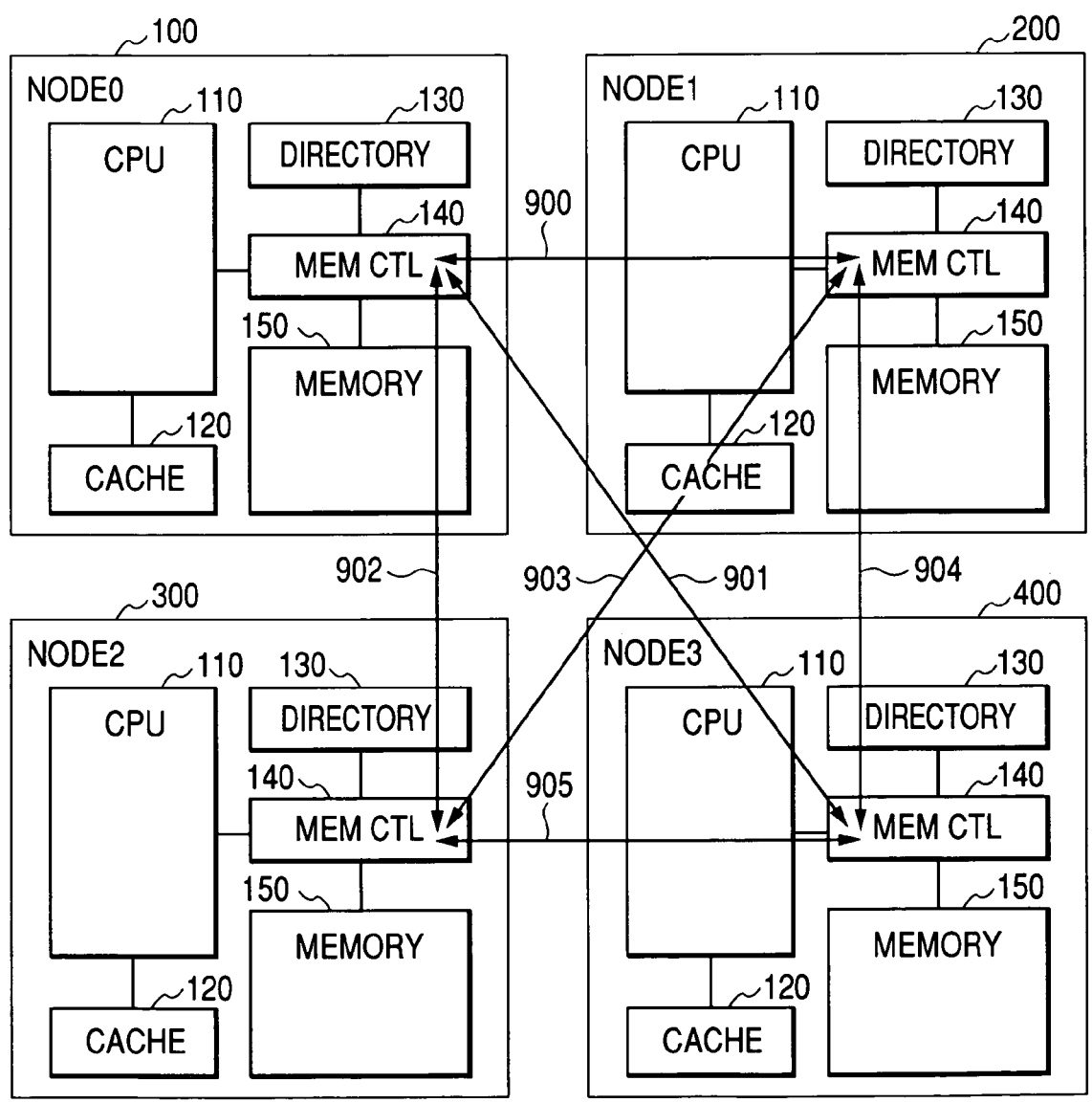
FIG. 1 is a block diagram showing a shared memory multiprocessor system according to an embodiment of the present invention.

FIG. 1 is a block diagram showing a shared memory multiprocessor according to an embodiment of the present invention.

Four nodes 100 to 400 (or nodes 0 to 3) are connected to one another through internode interfaces 900 to 905. Each node has the same configuration. For example, the node 0 (or node 100) comprises a CPU 110, a cache memory 120, a directory 130, a main memory control unit 140, and a main memory 150.

The cache memory 120 is a high-speed memory for storing a copy of data obtained from the main memory 150 and is searched using a portion of each memory address. This portion of each memory address used for searching the cache memory is referred to as a cache index portion.

It should be noted that even though FIG. 1 shows a system having four nodes, the present embodiment is not limited to this particular arrangement. The present embodiment can be applied to systems having any plurality of nodes.

Figure 2:
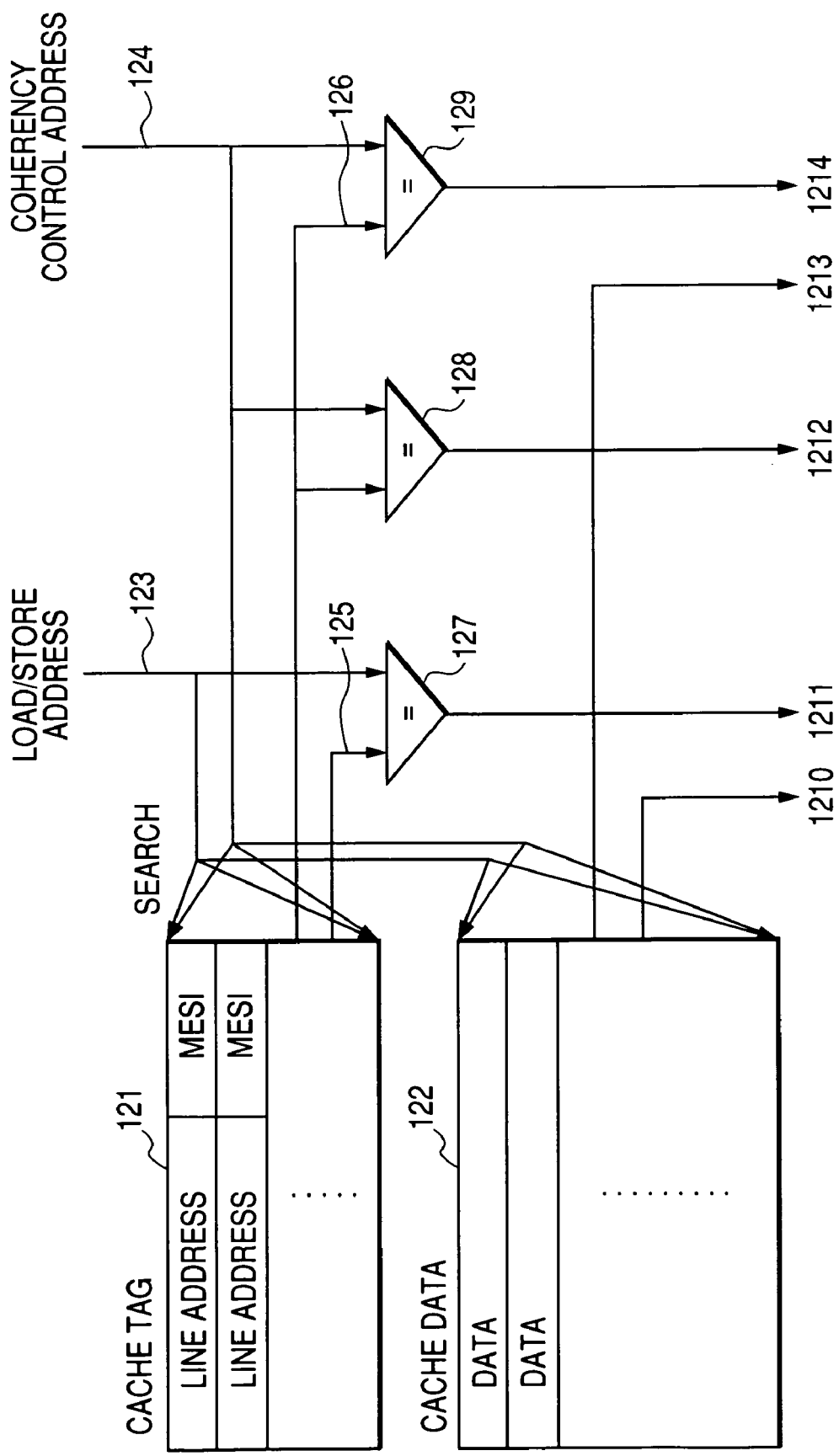
FIG. 2 is a diagram showing a cache memory of the multiprocessor system according to the embodiment.

FIG. 2 shows the details of the cache memory 120.

The cache memory 120 is primarily made up of a cache tag portion 121 and a cache data portion 122. The cache tag portion 121 stores the line addresses of data stored in the cache memory 120 and state information such as MESI information. The cache data portion 122 stores line data.

Receiving a load/store instruction, the cache memory 120 searches the cache tag portion 121 and the cache data portion 122 using the cache index portion of the target address 123 in the instruction. Specifically, the cache memory 120 compares the load/store address 123 with each line address 125 in the cache tag portion 121 by use of a comparator 127. The cache memory 120 outputs a cache hit signal 1211 indicating that the cache stores the data identified by the address 123 and reads out the load data 1210 (if there is a line address 125 that coincides with the load/store address 123).

Further, receiving a coherency control request issued or transferred from the CPU 110 of this node or one of the other nodes 200 to 400, the cache memory 120 searches the cache tag portion 121 and the cache data portion 122 using the cache index portion of an address 124 in the request. Specifically, the cache memory 120 compares the coherency control address 124 with each line address 126 in the cache tag portion 121 by use of a comparator 129. The cache memory 120 outputs a cache hit signal 1214 indicating that the cache stores the data identified by the address 124 and reads out the cache data 1213 (if there is a line address that coincides with the coherency control address 124).

Further, the cache memory 120 compares the node index portion (described later) and the directory index portion of the coherency control address 124 with those of each line address 126 in the cache tag portion 121 by use of a comparator 128. If the comparison indicates that the cache stores a copy of the memory region indicated by the directory entry corresponding to the coherency control address 124, the cache memory 120 outputs a signal 1212 indicating the presence of such a copy.

The directory 130 is a collection, or a table, of directory information on all memory regions of the main memory 150. The same directory entry is assigned to memory regions having the same address portion including the cache index portion (the memory regions forming a memory group). This address portion including the cache index portion is referred to as a directory index.

FIG. 3 shows the format of the memory address, indicating the portions assigned to the cache and the directory.

Since a directory index field 530 in the memory address is exactly the same as or includes a cache index field 520, the cache index corresponding to a given directory entry (address) can be uniquely identified. This makes it possible to determine whether the cache stores a copy of the memory region indicated by a given directory entry by reading the cache tag only once.

Each directory entry has N bits, where N is a natural number equal to or less than the number of nodes in the system. Each directory bit corresponds to a node or a node group (consisting of a plurality of nodes) within the system.

A directory bit is set to 1 when the cache in the node corresponding to the bit may store a copy of the memory region indicated by the directory index of the directory entry including the directory bit. All directory bits are initially reset to 0.

FIG. 4 shows an exemplary directory in which the directory index portion has n bits and each directory entry has four bits (N=4). FIG. 5 shows an exemplary directory of a system including M number of node groups. In this case, if the system includes a total of N nodes, then each node group includes N/M nodes (N nodes divided by M). In the example of FIG. 5, each directory entry has M bits and each directory bit corresponds to one of the M node groups. Coherency control is carried out on a node group basis. In the example of FIG. 5, on the other hand, each node group includes only one node (N=4, M=4).

Referring to FIG. 4, the four bits of each directory entry each correspond to one of the four nodes in the system. For example, the figure shows that: no nodes store a copy of the memory region indicated by the directory index 0 in their caches; the node 1 may store a copy of the memory portion indicated by the directory index 1 in its cache; and the nodes 2 and 3 may store a copy of the memory region indicated by the directory index 2 in their caches.

The main memory control unit 140 is dedicated to the main memory 150 and controls read/write operations to the main memory 150. Further, the main memory control unit 140 in each node is connected to those in other nodes through the internode interfaces 900 to 905 and performs operations such as transferring a request to other nodes, exchanging data with other nodes, and performing cache coherency control.

The main memories 150 in the nodes 100 to 400 each constitute a part of the entire physical memory of the shared memory multiprocessor; each main memory 150 has an exclusive memory space. A portion of each address called a node index (510) (shown in FIG. 3) uniquely identifies which node has the memory space indicated by the address. The node index 510 may start at any bit of the address. It need not necessarily start at the first bit. By checking the node index 510 of a given address, the main memory control unit 140 can determine which node includes the main memory to which the memory space identified by the address has been assigned.

A description will be given below of a data read operation from memory.

When reading data from memory, the CPU 110 first determines, by use of the comparator 127, whether the cache memory 120 stores the data. If the cache memory 120 stores the data to be read, the cache hit signal 1211 is set to "true". In this case, the CPU 110 completes the process by setting the data 1210 read from the cache memory 120 as load data.

If the cache memory 120 of this node 100 does not store the data to be read, the cache hit signal 1211 is set to "false". In this case, the CPU 110 sends to the main memory control unit 140 a request for reading the data from the main memory 150. The main memory control unit 140 checks the node index portion 510 of the read address to determine which node includes the main memory to which the read address has been assigned. If the read address has been assigned to the main memory of another node, the main memory control unit 140 transfers the request to the main memory control unit 140 of the another node through the internode interfaces 900 to 905.

If, on the other hand, the read address has been assigned to the main memory of this node, or the read request has been transferred to this node through the internode interfaces 900 to 905, then the main memory control unit 140 accesses the directory 130 based on the directory index portion 530 and checks each directory bit of the directory entry corresponding to the read address.

If all directory bits of the directory entry are set to 0, the CPU 110 determines that no other nodes have a copy of the data in their caches and hence reads the data from the cache memory 120 or the main memory 150 of this node without performing cache coherency control.

If, on the other hand, one or more of the directory bits of the directory entry are set to 1, the nodes corresponding to these bits may hold the latest data indicated by the read address. Therefore, the CPU 110 multicasts a coherency control request to the nodes corresponding to these bits. Each node in the system which has received the multicast coherency control request checks whether its cache stores the data indicated by the request and performs operations necessary for coherency control.

It should be noted that if one or more of the directory bits of the directory entry are set to 1, the CPU 110 may broadcast a coherency control request to all other nodes in the system instead of multicasting the request to only the nodes corresponding to these bits. However, the above-described method, which multicasts a coherency control request to only the nodes corresponding to the bits set to 1, requires fewer transactions for coherency control.

In coherency control, whether cache memory stores newer data than main memory is generally determined by reading the output of the comparator 129, MESI information, etc. If it is determined that the cache memory stores newer data, the data is written back to the main memory or transferred to the CPU that has issued a read request for the data. Furthermore, the MESI information is updated at the same time. Each node that has received a coherency control request determines whether the cache line in its cache indicated by the coherency control request stores a copy of the memory region (of the main memory of the node which has multicast the request) having the same directory index as the coherency control request.

Specifically, the node index portion 510 and the directory index portion 530 of the address 124 in the coherency control request is compared with those of the line address 126 in the cache tag portion indicated by the coherency control request by use of the comparator 128. If the comparison indicates that both the node index portion 510 and the directory index portion 530 match, it is determined that the cache stores a copy of the memory region.

If, on the other hand, it is determined that the cache stores no copy of the memory region, the node sends a directory bit reset request signal to the node (100) which has issued the coherency control request. The reset request signal is transferred to the node 100 through the internode interfaces 900 to 905. The node 100 resets the directory bit in the target directory entry corresponding to the node that has issued the reset request. If the directory bit corresponds to a plurality of nodes, it is reset only when all corresponding nodes have issued the reset request signal.

Further, when the main memory control unit 140 has detected a transaction for storing a copy of (a portion of) the main memory 150 in a cache, the control unit sets the directory bit in the target directory entry corresponding to the node that has made the copy.

As described above, the directory of the present embodiment allows each node to avoid performing cache coherency control for the nodes corresponding to the directory bits in the target directory entry which have been set to 0 when a memory access request has been issued. This can reduce cache coherency control traffic and thereby prevent performance reduction due to the bottleneck created by such coherency control.

Further, if a copy of a memory region has been overwritten by another copy and hence no longer exists in a cache, then hardware detects the absence of the copy in the cache during coherency control and resets the corresponding directory bit, eliminating the need for a reset operation by software.

It should be noted that the memory size required for implementing this directory is N*$2^n$ bits (per node). Therefore, it is possible to create a directory implemented by a considerably smaller amount of hardware than conventional directories by reducing the number n of bits of the directory index.

Incidentally, in the example shown in FIG. 5, if all directory bits of a target directory entry are set to 0, it is determined that no other nodes have a copy of the data and hence no cache coherency control is carried out.

If, on the other hand, one or more of the directory bits of the directory entry are set to 1, a coherency control request is multicast to the groups of nodes corresponding to these bits since their caches may store the latest data indicated by the read address. Each group of nodes in the system which have received the multicast coherency control request checks whether their caches store the data indicated by the request and performs operations necessary for coherency control.

It will be understood that other operations are the same as those described in connection with the example in FIG. 4.

Another embodiment of the present invention will be described below with reference to FIG. 6.

According to this example, each directory entry includes only one directory bit. The directory bit is set to 1 when the caches in other nodes may store a copy of the memory region corresponding to the bit (or the directory entry). All directory bits are initially set to 0.

If the directory bit of a directory entry is set to 0, it is determined that no other nodes have a copy of the data (indicated by the read address) in their caches and hence the data is read from the cache memory 120 or the main memory 150 of this node without performing cache coherency control.

If, on the other hand, the directory bit of the directory entry is set to 1, other nodes may store the latest data indicated by the read address. In the example of FIG. 6, the directory bit of the directory entry having the directory index "1" is set to 1. However, it is not possible to specify which node or nodes may store the data.

Therefore, a coherency control request is broadcast to all nodes. Each node in the system which has received the broadcast coherency control request checks whether its cache stores the data indicated by the request and performs operations necessary for coherency control.

The node that has issued the coherency control request, for example, the node 100, resets the directory bit only when it has received a reset request signal for the bit from all nodes. Further, when the main memory control unit 140 has detected a transaction for storing a copy of (a portion of) the main memory 150 in the cache of another node, the control unit resets the corresponding directory bit.

The memory size required for implementing the directory of the present embodiment is $2^n$ bits. Therefore, it is possible to create a directory implemented by a considerably smaller amount of hardware than conventional directories.

According to some of the above-described embodiments, the same directory entry may be assigned to memory regions having the same address portion including the cache index portion (the memory regions forming a memory group). This can considerably reduce the amount of hardware required for storing directory information, as compared to when each directory entry is assigned to a single line. Even with a set associative cache, which can store a plurality of lines having the same cache index value, it is possible to check all the lines having the same cache index in parallel to see whether they have been hit by reading out the cache tag only once if the cache has a general configuration. Therefore, the cache tag needs to be read only once to determine whether the cache stores no copy of the memory region indicated by a given directory entry, facilitating a reset operation on directory information by hardware.

This reduces the amount of hardware necessary for implementing a directory, making it possible to provide a directory requiring no support from software.

What is claimed is:

1. A multiprocessor having a shared main memory, which includes a plurality of nodes connected to one another, each node comprising:

a main memory having a plurality of memory regions for storing data;

a cache memory for storing a copy of data obtained from said main memory;

a CPU for accessing said main memory and said cache memory and processing data;

a directory for storing directory information on the plurality of memory regions of the main memory, a same directory bit being assigned to the plurality of memory regions having a same cache index of an address for accessing the main memory and the cache memory, wherein the directory includes a plurality of directory entries, the directory entries each including a directory bit having one bit per a plurality of the memory regions having the same cache index and the directory bit indicating whether the cache memory of another node stores a copy of at least a part of memory regions in said main memory of one node being managed by the directory bit; and a memory control unit for checking, when the node accesses said main memory, the directory bit corresponding to a memory region to be accessed; and multicasting or broadcasting an access address to all other nodes to perform coherency control if said directory bit is set to a predetermined value and, if none of said directory bit is set to said predetermined value, performing no coherency control.

2. The multiprocessor as claimed in claim 1, wherein said memory control unit includes means for checking, when coherency control of said cache memory is performed, a state of the cache memory in each node; and if said cache memories store no copy of a memory region to be subjected to said coherency control, resetting the directory bit corresponding to said memory region to a default value.

3. The multiprocessor as claimed in claim 1, wherein:

said cache memory includes a cache tag portion and a cache data portion, said cache tag portion storing state information and line addresses of data stored in said cache memory, said cache data portion storing line data; and said cache memory performs:
   searching said cache tag portion and said cache data portion using the cache index portion of a target address in a load/store instruction;
   comparing each line address stored in said cache tag portion with a load/store address in said load/store instruction by use of a comparator; and
   if there is a line address identical to said load/store address outputting a cache hit signal and reading out load data, said cache hit signal indicating that said cache memory stores data indicated by said target address.

4. The multiprocessor as claimed in claim 1, wherein:

said cache memory includes a cache tag portion and a cache data portion, said cache tag portion storing state information and line addresses of data stored in said cache memory, said cache data portion storing line data; and said cache memory performs:
   upon receiving a coherency control request transferred from the CPU of the one node or other said nodes, searching said cache tag portion and said cache data portion using an address in said coherency control request;
   comparing each line address stored in said cache tag portion with said address in said coherency control request by use of a comparator; and
   if there is a line address identical to said address in said coherency control request outputting a cache hit signal and reading out cache data, said cache hit signal indicating that said cache memory stores data indicated by said address in said coherency control request.

5. The multiprocessor as claimed in claim 1, wherein:

said cache memory includes a cache tag portion and a cache data portion, said cache tag portion storing state information and line addresses of data stored in said cache memory, said cache data portion storing line data; and said cache memory including means for:
   comparing a coherency control address with a node index portion and a directory index portion of an index of each line address stored in said cache tag portion by use of a comparator, said coherency control address being issued and transferred from the CPU of this node or other nodes; and
   if there is a line address whose node index portion and directory index portion are included in said coherency control address outputting a signal indicating that said cache memory stores a copy of a memory region indicated by the directory entry corresponding to said coherency control address.

6. The multiprocessor as claimed in claim 1, wherein:

when said multiprocessor is initialized, each directory bit is reset to a default value; and when a copy of a memory region of said main memory is created in a cache memory, the corresponding directory bit is set to said predetermined value.

7. The directory implemented in each node of the multiprocessor as claimed in claim 1.

8. A microprocessor having a shared main memory, which includes a plurality of N nodes connected to one another, each node comprising:

a main memory having a plurality of memory regions for storing data;

a cache memory for storing a copy of data obtained from said main memory;

a CPU for accessing said main memory and said cache memory and processing data;

a directory for storing directory information on the plurality of memory regions of the main memory, a same directory bit being assigned to the plurality of memory regions having a same cache index of an address for accessing the main memory and the cache memory, wherein the directory includes a plurality of directory entries, the directory entries each including a plurality of directory bits which each one bit is corresponding to each of the nodes and having one bit per a plurality of the memory regions having the same cache index and each directory bit indicating whether the cache memory of at least one of other nodes stores a copy of at least a part of memory regions in said main memory of one node being managed by the directory bit; and a memory control unit for checking, when the node accesses said main memory, the directory bit corresponding to a memory region to be accessed; and multicasting or broadcasting an access address to specified other nodes of which corresponding directory bit is set to a predetermined value to perform coherency control if said directory bit is set to a predetermined value and, if none of said directory bit is set to said predetermined value, performing no coherency control.

9. The multiprocessor as claimed in claim 8, wherein said memory control unit includes means for checking, when coherency control of said cache memory is performed, a state of the cache memory in each node; and if said cache memories store no copy of a memory region to be subjected to said coherency control, resetting the directory bit corresponding to said memory region to a default value.

10. The multiprocessor as claimed in claim 8, wherein:
said cache memory includes a cache tag portion and a cache data portion, said cache tag portion storing state information and line addresses of data stored in said cache memory, said cache data portion storing line data; and
said cache memory performs:
  searching said cache tag portion and said cache data portion using the cache index portion of a target address in a load/store instruction;
  comparing each line address stored in said cache tag portion with a load/store address in said load/store instruction by use of a comparator; and
  if there is a line address identical to said load/store address outputting a cache hit signal and reading out load data, said cache hit signal indicating that said cache memory stores data indicated by said target address.

11. The multiprocessor as claimed in claim 8, wherein:
said cache memory includes a cache tag portion and a cache data portion, said cache tag portion storing state information and line addresses of data stored in said cache memory, said cache data portion storing line data; and
said cache memory performs:
  upon receiving a coherency control request transferred from the CPU of the one node or other said nodes, searching said cache tag portion and said cache data portion using an address in said coherency control request;
  comparing each line address stored in said cache tag portion with said address in said coherency control request by use of a comparator; and
  if there is a line address identical to said address in said coherency control request outputting a cache hit signal and reading out cache data, said cache hit signal indicating that said cache memory stores data indicated by said address in said coherency control request.

12. The multiprocessor as claimed in claim 8, wherein:
said cache memory includes a cache tag portion and a cache data portion, said cache tag portion storing state information and line addresses of data stored in said cache memory, said cache data portion storing line data; and
said cache memory including means for:
  comparing a coherency control address with a node index portion and a directory index portion of an index of each line address stored in said cache tag portion by use of a comparator, said coherency control address being issued and transferred from the CPU of this node or other nodes; and
  if there is a line address whose node index portion and directory index portion are included in said coherency control address outputting a signal indicating that said cache memory stores a copy of a memory region indicated by the directory entry corresponding to said coherency control address.

13. A multiprocessor of a type having a shared main memory, which includes N nodes connected to one another (where N is an integer larger than 1), said N nodes forming M node groups including N/M nodes (where M is an integer larger than 1), each node comprising:

a main memory having a plurality of memory regions for storing data;
a cache memory for storing a copy of data obtained from said main memory;
a CPU for accessing said main memory and said cache memory and processing data;
a directory for storing directory information on the plurality of memory regions of the main memory, a same directory bit being assigned to the plurality of memory regions having a same cache index of an address for accessing the main memory and the cache memory, wherein the directory includes a plurality of directory entries, the directory entries each including M directory bits per the M node groups, each directory bit having one bit and indicating whether the cache memories of nodes in another node group may store a copy of at least a part of a memory region group of said main memory of one node group, each of the M directory bits corresponding to one of the M node groups; and
a memory control unit for setting, when a copy of a memory region of said main memory is created in the cache memory of a node, one of the M directory bits of the directory entry corresponding to said memory region to a predetermined value, said one of said M directory bits corresponding to the node group including said node; checking, when this node accesses said main memory, the directory bits of the directory entry corresponding to a memory region to be accessed, and if one or more of said directory bits of said directory entry are set to said predetermined value, multicasting said access address to specified node groups corresponding to said one or more of said directory bits set to said predetermined value, to perform coherency control; and if none of said directory bits of said directory entry is set to said predetermined value, performing no coherency control.

14. The multiprocessor as claimed in claim 13, wherein said memory control unit further performs checking, when said coherency control is performed, the cache memories of nodes in related node groups; and
  if the cache memories of the nodes in a node group store no copy of a memory region group to be subjected to said coherency control, resetting a directory bit in the directory entry corresponding to said memory region group (to a default value), said directory bit corresponding to said node group.

15. A method for performing internode cache coherency control in a multiprocessor system which includes a plurality of nodes connected to one another, each node comprising:
a main memory having a plurality of memory regions for storing data;
a cache memory for storing a copy of data obtained from said main memory; and
a CPU for accessing said main memory and said cache memory and processing data;
wherein said method comprises the steps of:
providing a directory for storing directory information on the plurality of memory regions of the main memory, the directory including a plurality of directory entries;
assigning a same directory bit to the plurality of memory regions having a same cache index of an address for accessing the main memory and the cache memory, wherein each of the directory entries includes a directory bit having one bit which each indicates whether the cache memory of another node may store a copy of at least a part of a memory region in said main memory of one node;

when a node accesses said main memory, checking whether the directory bit corresponding to a memory region to be accessed is set to a predetermined value;

if said directory bit is set to said predetermined value, multicasting or broadcasting an access address to other nodes to perform coherency control; and if none of said directory bit is set to said predetermined value, performing no coherency control.

16. The method as claimed in claim 15, further comprising a step of:

when a copy of a memory region of said main memory is created in a cache memory, the corresponding directory bit is set to said predetermined value.

17. The method as claimed in claim 15, further comprising steps of:

when coherency control of said cache memory is performed, checking states of the cache memories in all nodes; and if said cache memories store no copy of a memory region group to be subjected to said coherency control, resetting the directory bits corresponding to said memory region group to a default value.

18. The method as claimed in claim 15, further comprising steps, performed by said cache memory, of:

upon receiving a coherency control request transferred from the CPU of the one node or other nodes, searching a cache tag portion and a cache data portion of said cache memory using an address in said coherency control request, said cache tag portion storing state information and line addresses of data stored in said cache memory, said cache data portion storing line data;

comparing each line address stored in said cache tag portion with said address in said coherency control request by use of a comparator; and if there is a line address identical to said address in said coherency control request outputting a cache hit signal and reading out cache data, said cache hit signal indicating that said cache memory stores data indicated by said address in said coherency control request.

19. The method as claimed in claim 15, further comprising steps of:

if all directory bits of a directory entry are set to 0, reading the data indicated by said directory entry from said cache memory or said main memory of this node without performing cache coherency control; and if one or more of said directory bits of said directory entry are set to 1, multicasting a coherency control request to the nodes corresponding to said one or more of said directory bits;

wherein upon receiving said coherency control request, said nodes perform steps of:

checking whether their caches store the data indicated by said request; and performing a control operation for coherency control.

* * * * *